US012590608B2

(12) United States Patent
Chiu et al.

(10) Patent No.: US 12,590,608 B2
(45) Date of Patent: Mar. 31, 2026

(54) ELECTRONIC DEVICE AND COUPLER THEREOF

(71) Applicant: Wistron NeWeb Corp., Hsinchu (TW)

(72) Inventors: Yu-Kai Chiu, Hsinchu (TW); Ming-Hung Hung, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 553 days.

(21) Appl. No.: 18/063,221

(22) Filed: Dec. 8, 2022

(65) Prior Publication Data

US 2024/0090145 A1 Mar. 14, 2024

(30) Foreign Application Priority Data

Sep. 8, 2022 (TW) .................................. 111134018

(51) Int. Cl.
*F16D 3/04* (2006.01)
*H01Q 3/04* (2006.01)

(52) U.S. Cl.
CPC ................. *F16D 3/04* (2013.01); *H01Q 3/04* (2013.01)

(58) Field of Classification Search
CPC . F01C 17/066; F16D 3/04; F16D 3/50; F16D 3/72; F16H 2001/326; H01Q 1/02; H01Q 3/02; H01Q 3/04; H01Q 3/06; H05K 7/20336
USPC ................................ 464/102, 103, 104, 105
See application file for complete search history.

(56) References Cited

U.S. PATENT DOCUMENTS

| | | | | |
|---|---|---|---|---|
| 832,877 | A | * 10/1906 | Richards | F16C 33/1065 |
| | | | | 464/104 |
| 1,665,701 | A | * 4/1928 | Holdener | F16H 1/32 |
| | | | | 475/177 |
| 1,907,447 | A | * 5/1933 | Schiltz | B23B 31/08 |
| | | | | 464/103 |
| 3,454,283 | A | * 7/1969 | Benjamin | F16D 3/04 |
| | | | | 464/103 |
| 4,108,606 | A | * 8/1978 | Wingard | B29B 7/7663 |
| | | | | 464/104 |
| 5,757,615 | A | 5/1998 | Donahoe | |
| 6,257,987 | B1 | * 7/2001 | Lin | F16D 3/50 |
| | | | | 464/179 |
| 6,288,896 | B1 | * 9/2001 | Hsu | G06F 1/203 |
| | | | | 174/15.2 |
| 6,517,439 | B1 | 2/2003 | Sears | |
| 10,448,264 | B2 | * 10/2019 | Elson | H01Q 3/02 |
| 10,721,842 | B1 | * 7/2020 | Fathi | H05K 7/20336 |
| 10,731,709 | B2 | * 8/2020 | Dettinger | F16D 3/04 |

(Continued)

FOREIGN PATENT DOCUMENTS

| | | |
|---|---|---|
| CN | 201705825 U | 1/2011 |
| CN | 102478038 A | 5/2012 |
| CN | 204437095 U | 7/2015 |

(Continued)

*Primary Examiner* — Josh Skroupa
(74) *Attorney, Agent, or Firm* — McClure, Qualey & Rodack, LLP

(57) ABSTRACT

A coupler adapted to be connected to a power source and a rotatable member. The coupler includes a plate body and a coupler protrusion. A coupler groove is formed on the plate body, and the power source is adapted to be wedged into the coupler groove. The coupler protrusion is disposed on the plate body and adapted to be wedged into the rotatable member.

16 Claims, 9 Drawing Sheets

(56)          References Cited

U.S. PATENT DOCUMENTS

| | | | |
|---|---|---|---|
| 11,380,986 | B2 | 7/2022 | Lin |
| 2023/0007808 | A1 * | 1/2023 | Lau .......................... H01Q 1/02 |

FOREIGN PATENT DOCUMENTS

| | | | | | |
|---|---|---|---|---|---|
| CN | 206943246 | U | * | 1/2018 | ............... F16D 3/27 |
| CN | 109780076 | A | | 5/2019 | |
| CN | 113983078 | A | | 1/2022 | |
| CN | 217301325 | U | * | 8/2022 | ............... F16D 3/12 |
| DK | 161536 | B | * | 7/1991 | ............... F16D 3/04 |
| FR | 2836966 | A1 | * | 9/2003 | ............... F16D 3/68 |
| GB | 613788 | A | * | 12/1948 | ........... F01C 17/066 |
| JP | 58034234 | A | * | 2/1983 | ............... G03D 3/13 |
| JP | 04282025 | A | * | 10/1992 | ............... F16D 3/04 |
| TW | 310388 | B | | 7/1997 | |
| TW | 202107771 | A | | 2/2021 | |

* cited by examiner

E

E

22

Rotatable Base

23

Antenna Module

ELECTRONIC DEVICE AND COUPLER THEREOF

CROSS REFERENCE TO RELATED APPLICATIONS

This application claims the benefit of priority to Taiwan Patent Application No. 111134018, filed on Sep. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE INVENTION

Field of the Invention

The present disclosure relates to a coupler, and more particularly, to a coupler that can be disposed in an electronic device.

Description of the Related Art

Due to the small coverage angle of the 5G signal, the conventional 5G wireless routers often has poor reception and had to get a better signal transmission by turning the orientation of its antenna module. However, the deviation caused by the assembly tolerance during mass production of the product often makes the torque generated by the motor unable to be transferred effectively and even to a point of unable to rotate the antenna module. The deviation would also lead to an increase in wear and tear of the motor, thereby shortening the motor's service life.

BRIEF SUMMARY OF THE INVENTION

In view of the aforementioned issues, it is an object of the present disclosure to provide a coupler that is adapted to be connected between a power source and a rotatable member. The coupler includes a plate body and a coupler protrusion. There is a coupler groove formed on the plate body, and the power source is adapted to be wedged into the coupler groove. The coupler protrusion is disposed on the plate body and adapted to be wedged into the rotatable member.

It is another object of the present disclosure to provide an electronic device, which includes a mounting bracket, a power source, a coupler, and a rotatable member. The power source is disposed on the mounting bracket and includes a power source protrusion. The coupler includes a plate body and a coupler protrusion. There is a coupler groove formed on the plate body, and the power source is wedged into the coupler groove. The coupler protrusion is disposed on the plate body. The rotatable member includes a rotatable member connecting slot, and the coupler protrusion is wedged into the rotatable member connecting slot.

The coupler according to the present disclosure is adapted to be connected to the power source and the rotatable member, and in one embodiment, the antenna module is disposed on the rotatable member. By applying the coupler of the present disclosure, the deviation due to the assembly tolerance inside the product can be compensated or absorbed so as to ensure an effective transfer of the torque generated by the motor and prevent the occurrence of the antenna module being unable to be rotated. The coupler of the present disclosure is easy to assemble, has wide adaptability, and with low cost. Using the coupler of the present disclosure will not only effectively transfer the torque generated by the motor, but also reduce motor wear and tear and prolong the service life of the motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
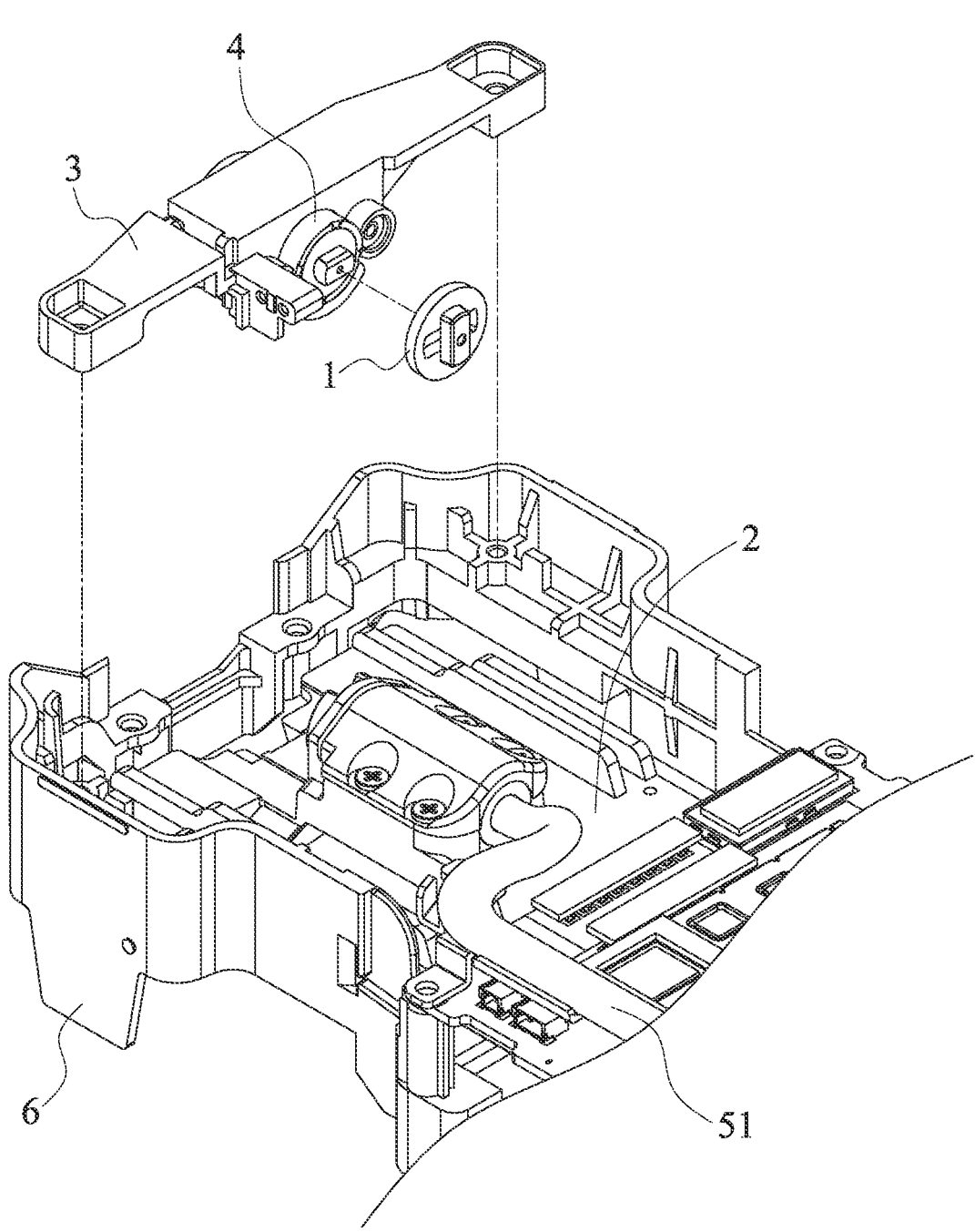
FIG. 1 is a schematic exploded diagram of an electronic device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
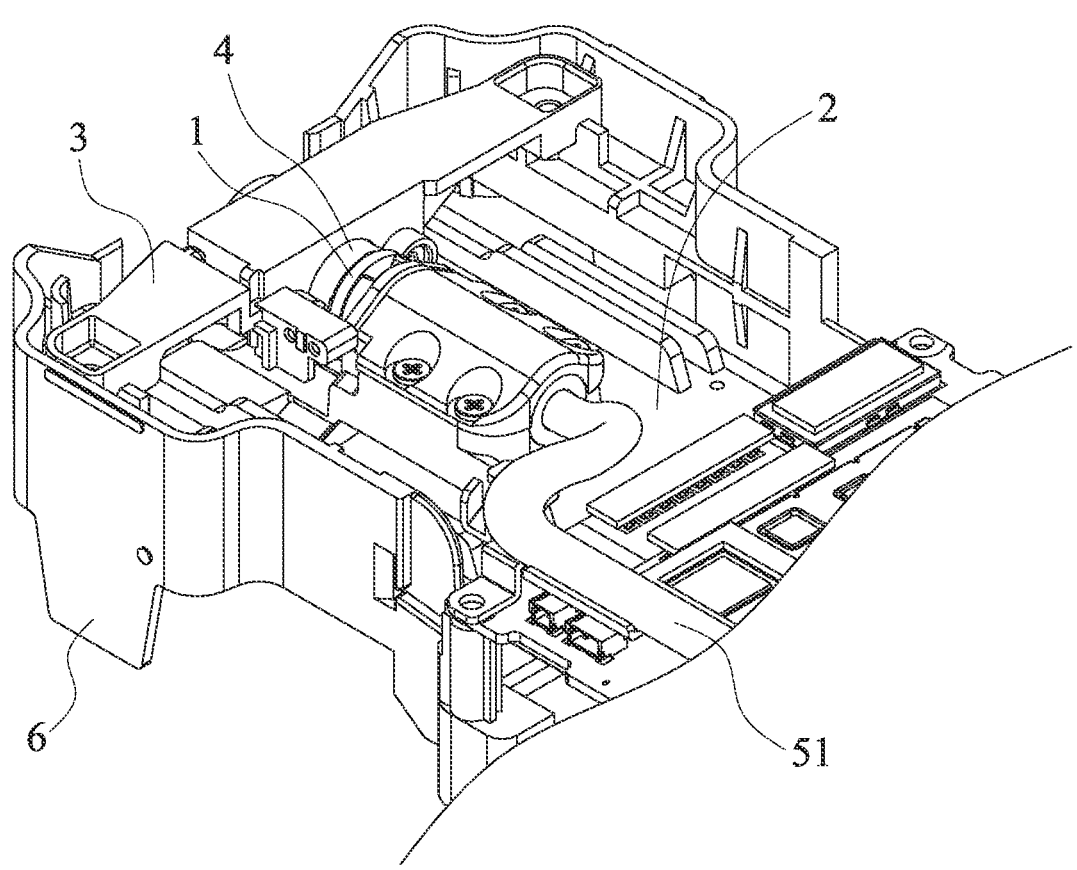
FIG. 2 is a schematic assembly diagram of an electronic device according to an embodiment of the present disclosure.

Referring to FIG. 1 and FIG. 2, an electronic device E according to an embodiment of the present disclosure includes a mounting bracket, 3, a power source 4, a coupler 1, and a rotatable member 2. The power source is disposed on the mounting bracket 3. In one embodiment, the power source 4 is an electric motor, and the rotatable member 2 is a metal component, but the present disclosure is not limited thereto.

In one embodiment, the electronic device E is a wireless router, but the present disclosure is not limited thereby. The coupler can be used in other electronic devices or in other equipment or apparatus.

Figure 3A:
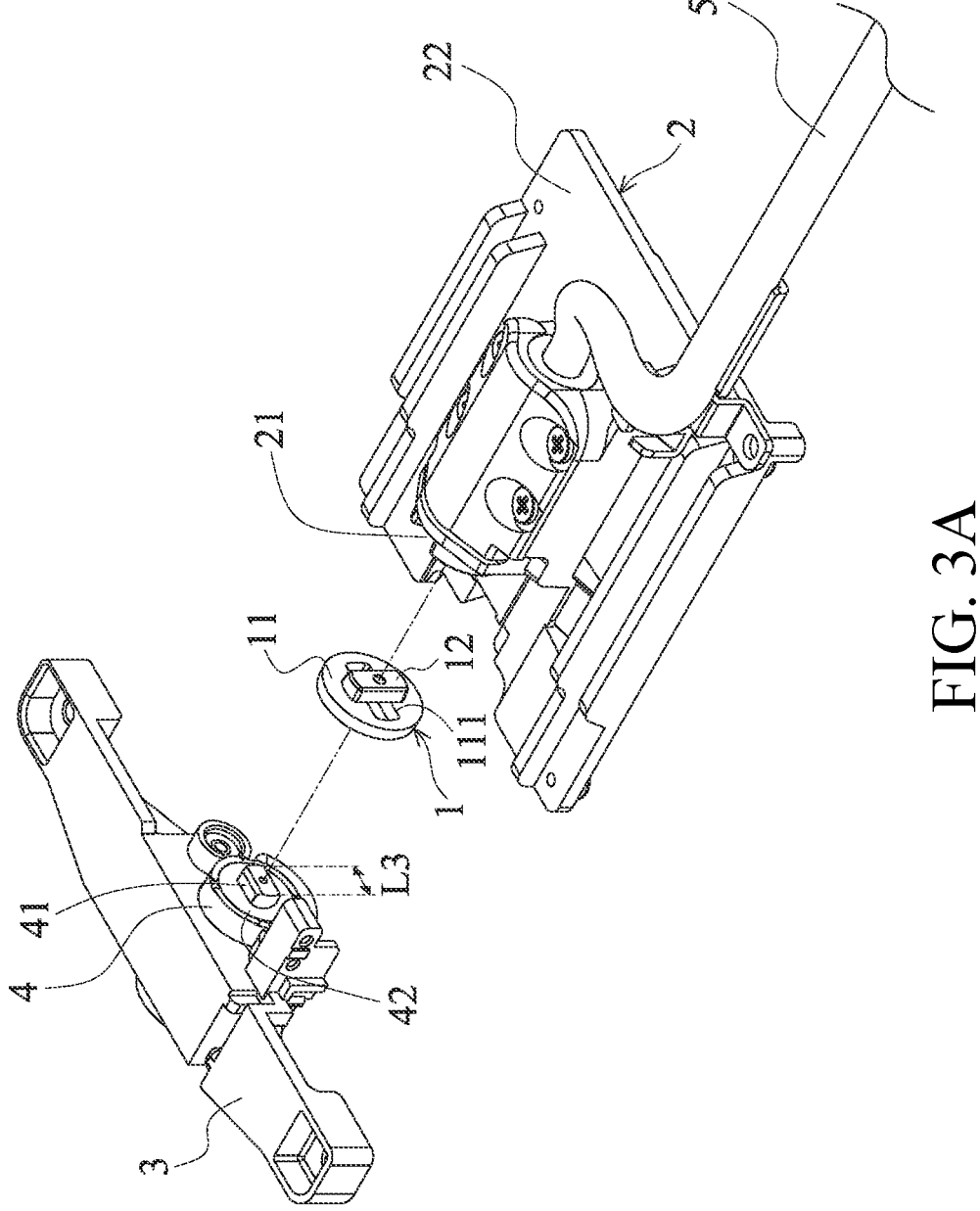
FIG. 3A is a schematic e view illustrating detailed structure of an electronic device according to an embodiment of the present disclosure.
Figure 3B:
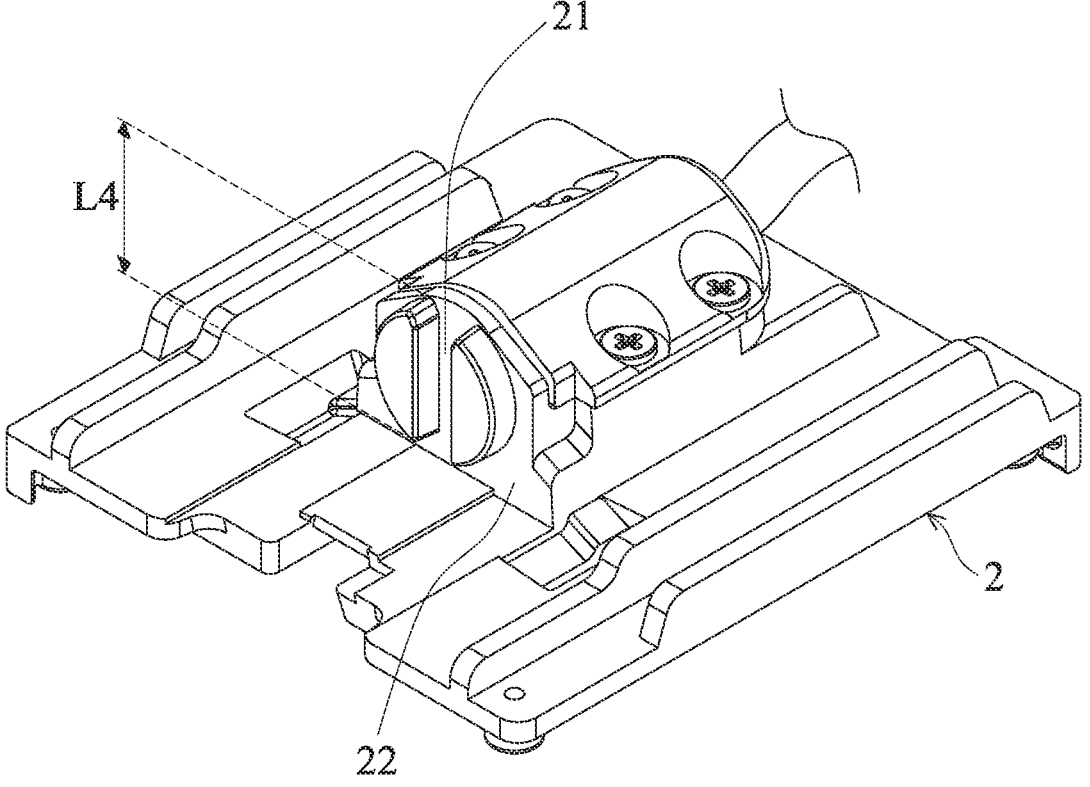
FIG. 3B is a schematic view illustrating a rotatable member connecting slot according to an embodiment of the present disclosure.

Referring to FIG. 3A and FIG. 3B, the power source 4 includes a power source protrusion 41. The coupler 1 includes a plate body 11 and a coupler protrusion 12, the coupler protrusion 12 is disposed on the plate body 11. There is a coupler groove 111 formed on the plate body 11, and the power source protrusion 41 is wedged into the coupler groove 111. The rotatable member 2 includes a rotatable member connecting slot 21, and the coupler protrusion 12 is wedged into the rotatable member connecting slot 21.

Figure 4:
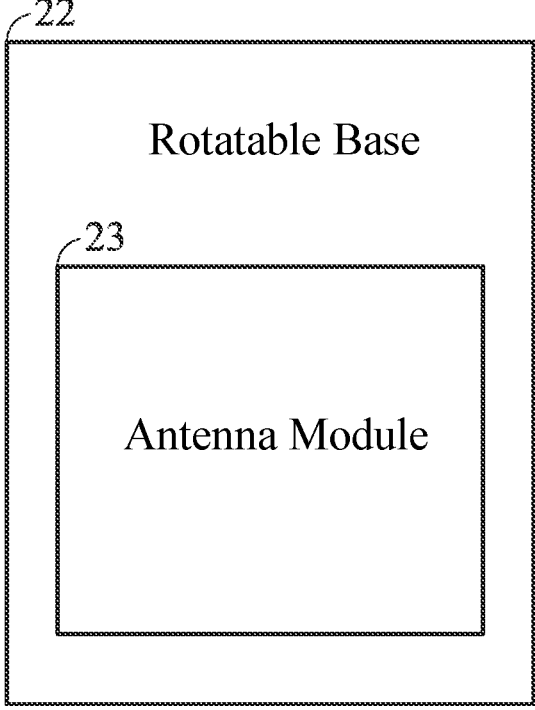
FIG. 4 is a schematic view of an antenna module according to an of the present disclosure.

Referring to FIG. 3A and FIG. 4, in one embodiment, the rotatable member 2 includes a rotatable base 22 and an antenna module 23 disposed on the rotatable base 22, and the rotatable member connecting slot 21 is formed on the rotatable base 22. In one embodiment, the antenna module 23 is formed on the front side of the rotatable base 22, and the rotatable member connecting slot 21 is formed on the back side of the rotatable base 22, but the present disclosure is not limited thereto. In one embodiment, there is a heat sink or cooling fins formed on the rotatable base 22.

Referring to FIG. 1, FIG. 2, and FIG. 3A, in one embodiment, the electronic device E further includes a heat pipe 51, and the heat pipe 51 is pivotally connected to the rotatable base 22.

Referring to FIG. 1 and FIG. 2, the electronic device E further includes a device housing 6, and the mounting bracket 3 is fixedly connected to the device housing 6. In one embodiment, the heat pipe 51 is thermally connected to the device housing 6. In specific, the device housing 6 includes a plastic housing member and a metal housing member (not shown), and the plastic housing member is connected to the metal housing member. The heat pipe 51 is thermally connected to the metal housing member. In one embodiment, the metal housing member has cooling fins or other heat dissipating structure but the present disclosure is not limited thereby.

Figure 5A:
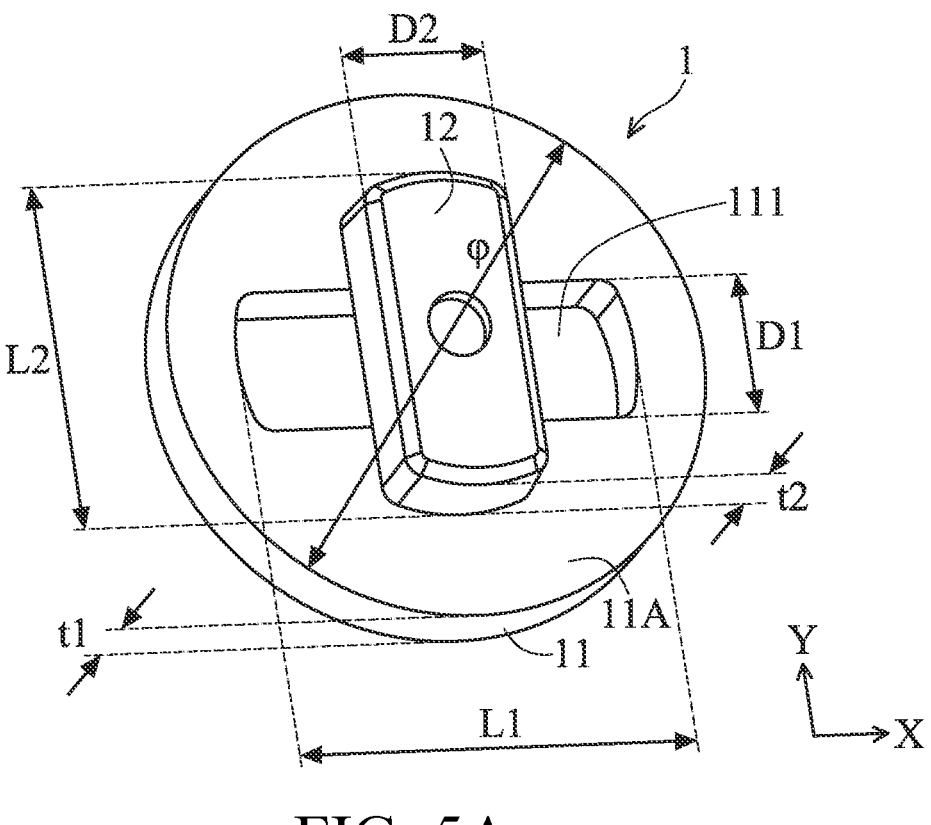
FIGS. 5A and 5B are schematic views illustrating detailed structure of a coupler according to an embodiment of the present disclosure.
Figure 5B:
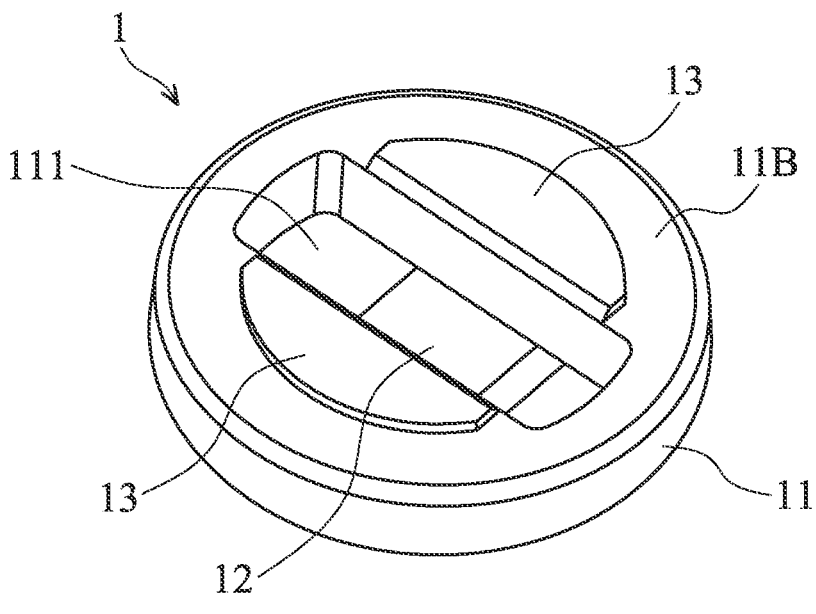

Referring to FIG. 5A and FIG. 5B, the coupler 1 includes a plate body 11 and a coupler protrusion 12. A coupler groove 111 is formed on the plate body 11, and the power source 4 is adapted to be wedged into the coupler groove 111. The coupler protrusion 12 is disposed on the plate body 11 and adapted to be wedged into the rotatable member 2. In one embodiment, the coupler groove 111 has a first length direction X, and the coupler protrusion 12 has a second length direction Y. The first length direction X is perpendicular to the second length direction Y.

Referring to FIG. 5A, in one embodiment, the coupler groove 111 has a first length L1, and the coupler protrusion 12 has a second length L2. The first length L1 is less than or equal to the second length L2. Thus, the coupler 1 is able to absorb/compensate the deviation in the first length direction X and the second length direction Y and provide consistent absorbent effect to both.

Referring to FIG. 5A, in one embodiment, the coupler groove 111 has a first width D1, and the coupler protrusion 12 has a second width D2. The ratio of the first length L1 to the first width D1 is between 2.6 and 3.0, and the ratio of the second length L2 to the second width D2 is between 1.9 and 2.3. Hence, the torque generated by the power source 4 is transferred with better efficiency.

Referring to FIG. 5A, in one embodiment, the plate body 11 is circular and has a plate diameter φ. The ratio of the plate diameter φ to the first length L1 is between 1.3 and 1.4, and the ratio of the plate diameter φ to the second width D2 is between 3.5 and 4.0. Therefore, the stress on the coupler 1 is dispersed to avoid stress concentration on the coupler 1 and improve the structural strength of the coupler 1.

Referring to FIG. 5A, in one embodiment, the plate body 11 has a plate thickness t1, and the coupler protrusion 12 has a protrusion thickness t2. The ratio of the plate diameter φ to the plate thickness t1 is between 6.0 and 7.0, and the ratio of the plate diameter φ to the protrusion thickness t2 is between 6.0 and 7.0. As such, the coupler 1 transfers the torque generated by the power source 4 more effectively.

Referring to FIGS. 5A and 5B, in one embodiment, the plate body 11 has a first surface 11A and a second surface 11B, and the coupler protrusion 12 is formed on the first surface 11A. The coupler 1 further includes two stopper blocks 13, and the two stopper blocks 13 are formed on the second surface 11B and located at two sides of the coupler groove 111.

Figure 6:
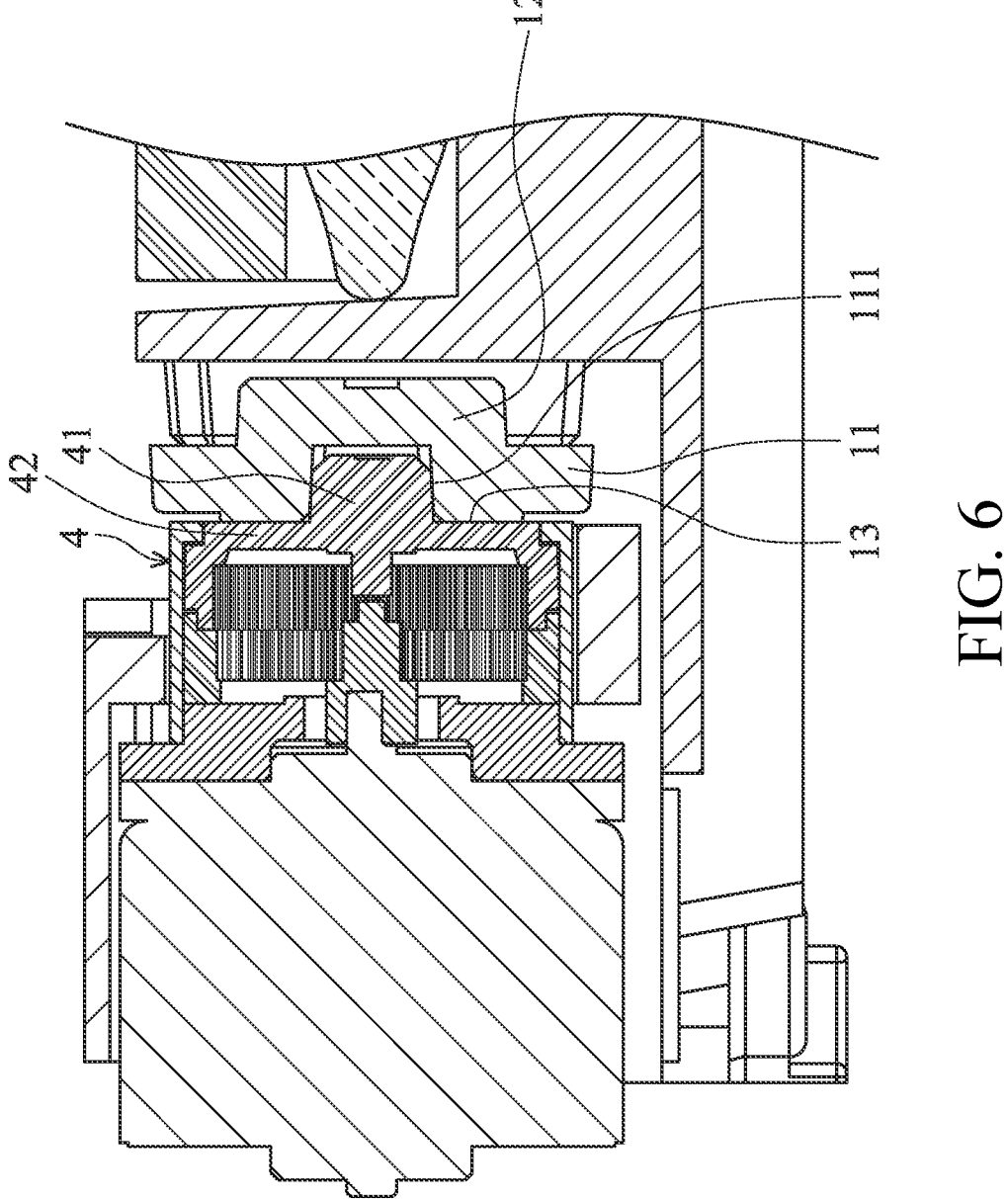
FIG. 6 is a schematic cross-sectional view of a power source and a coupler according to an embodiment of the present disclosure.

Referring to FIGS. 3 and 6, in one embodiment, the power source 4 includes a power source rotating plate 42, and the power source protrusion 41 is formed on the power source rotating plate 42. The stopper blocks 13 abut against the power source rotating plate 42 so as to prevent friction between the coupler 1 and the external casing of the power source 4.

Referring to FIGS. 3A, 3B, and 5A, in one embodiment, the power source protrusion 41 is rectangular or oval. In one embodiment, the power source protrusion 41 has a third length L3, and the rotatable member connecting slot 21 has a fourth length L4. The third length L3 is less than or equal to the first length L1, and the fourth length L4 is greater than or equal to the second length L2.

Figure 7A:
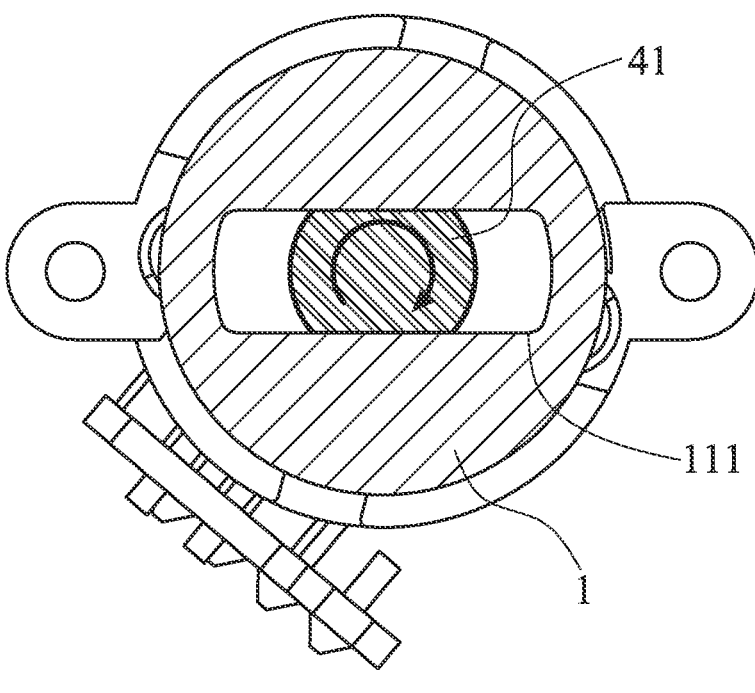
FIGS. 7A and 7B are schematic views illustrating a coupler of the present disclosure in action with no deviation between a power source protrusion and a rotatable member connecting slot.
Figure 7B:
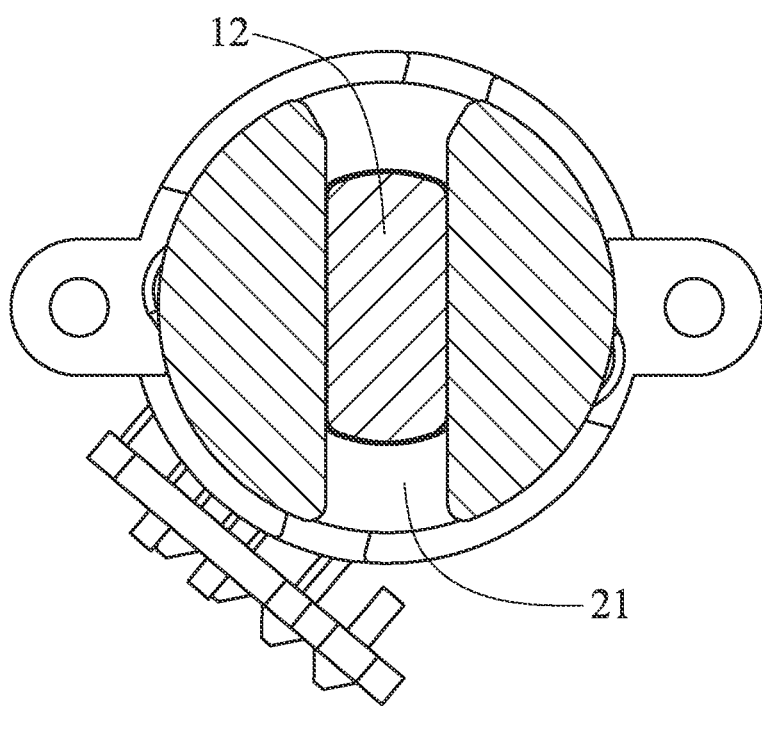

Referring to FIGS. 7A and 7B, when there is no deviation between the power source protrusion 41 and the rotatable member connecting slot 21, the power source protrusion 41 is connected to the center part of the coupler groove 111, and the coupler protrusion 12 is connected to the center part of the rotatable member connecting slot 21. The torque generated by the power source 4 can then be transferred smoothly to the rotatable member 2, and the rotatable member 2 is thereby rotated.

Figure 8A:
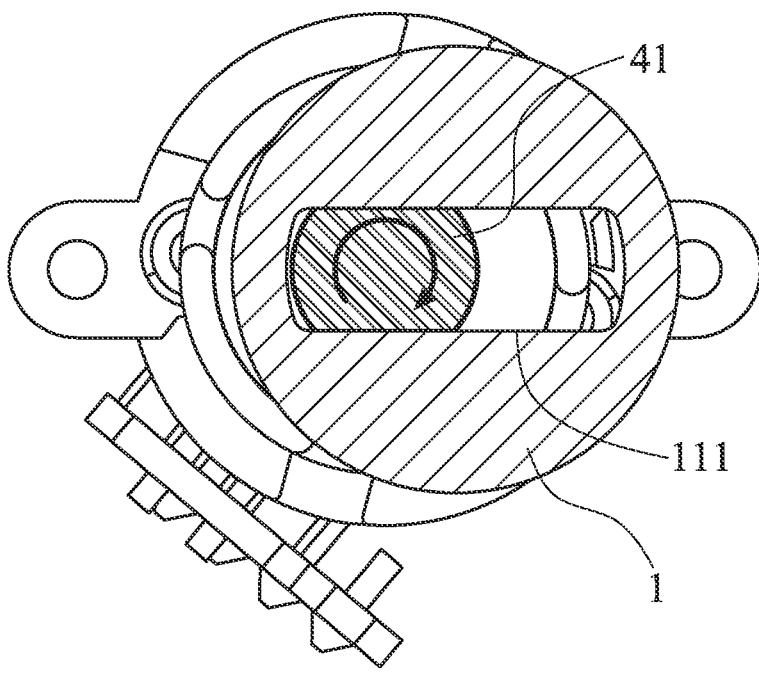
FIGS. 8A and 8B are schematic views illustrating a coupler of the present disclosure in action with deviation between a power source protrusion and a rotatable member connecting slot.
Figure 8B:
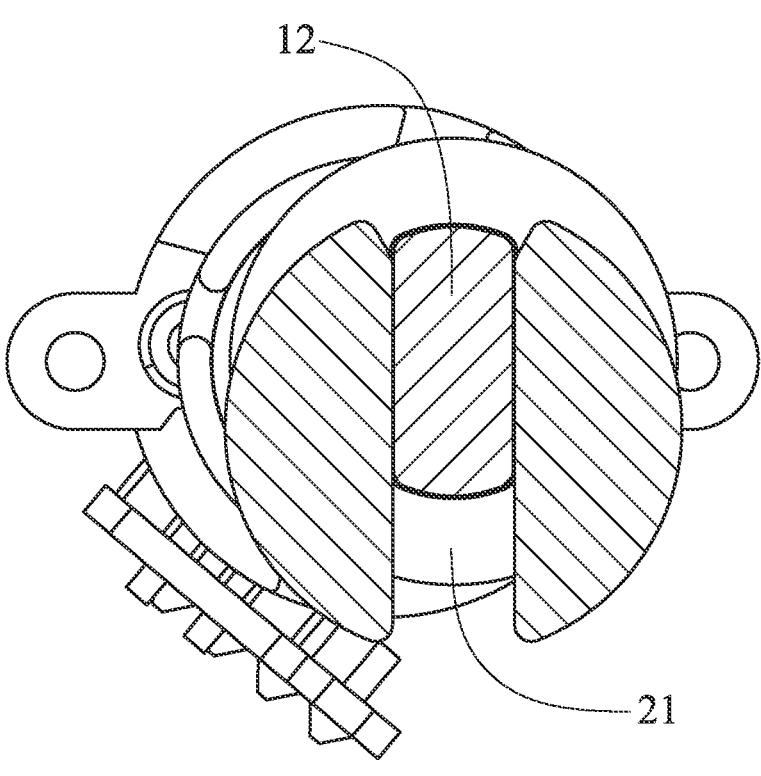

Referring to FIGS. 8A and 8B, when there is deviation between the power source protrusion 41 and the rotatable member connecting slot 21, the power source protrusion 41 is able to slide within the coupler groove 111, and the coupler protrusion 12 is able to slide within the rotatable member connecting slot 21. The torque generated by the power source 4 can still be smoothly transferred to the rotatable member 2 to rotate the rotatable member 2.

The coupler of the present disclosure is adapted to be connected to the power source and the rotatable member, and in one embodiment, the antenna module is disposed on the rotatable member. By applying the coupler of the present disclosure, the deviation caused by assembly tolerance inside the product can be absorbed or compensated, so as to ensure the torque generated by the motor is effectively transferred to prevent the antenna module from unable to be rotated. The coupler of the present disclosure is easy to assemble, diversely adaptable, and low cost. Using the coupler of the present disclosure not only could the torque generated by the motor be transferred effectively, but also could reduce the wear and tear of the motor as well as prolong the service life of the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A coupler adapted to be connected to a power source and a rotatable member, the coupler comprising:

a plate body, wherein a coupler groove is formed on the plate body, the power source is adapted to be wedged into the coupler groove, and the coupler groove is opened at the top and bottom but closed on all sides; and a coupler protrusion disposed on the plate body, wherein the coupler protrusion is adapted to be wedged into the rotatable member, and the coupler protrusion does not reach an outer edge of the plate body.

2. The coupler according to claim 1, wherein the coupler groove comprises a first length direction, the coupler protrusion comprises a second length direction, and the first length direction is perpendicular to the second length direction.

3. The coupler according to claim 1, wherein the coupler groove comprises a first length, the coupler protrusion comprises a second length, and the first length is less than or equal to the second length.

4. The coupler according to claim 3, wherein the coupler groove comprises a first width, the coupler protrusion comprises a second width, a ratio of the first length to the first width is between 2.6 and 3.0, and a ratio of the second length to the second width is between 1.9 and 2.3.

5. The coupler according to claim 4, wherein the plate body is circular and comprises a plate diameter, a ratio of the plate diameter to the first length is between 1.3 and 1.4, and a ratio of the plate diameter to the second width is between 3.5 and 4.0.

6. The coupler according to claim 5, wherein the plate body comprises a plate thickness, the coupler protrusion comprises a protrusion thickness, a ratio of the plate diameter to the plate thickness is between 6.0 and 7.0, and a ratio of the plate diameter to the protrusion thickness is between 6.0 and 7.0.

7. The coupler according to claim 1, wherein the plate body comprises a first surface and a second surface, the coupler protrusion is formed on the first surface, the coupler further comprises two stopper blocks formed on the second surface and located at two sides of the coupler groove.

8. An electronic device comprising:

a mounting bracket;

a power source disposed on the mounting bracket and comprising a power source protrusion;

a coupler comprising a plate body and a coupler protrusion disposed on the plate body, wherein a coupler groove is formed on the plate body, the power source protrusion is wedged into the coupler groove, the coupler groove is opened at the top and bottom but closed on all sides, the power source protrusion is configured to slide in the coupler groove, and the coupler protrusion does not reach an outer edge of the plate body;

a rotatable member comprising a rotatable member connecting slot, wherein the coupler protrusion is wedged into the rotatable member connecting slot.

9. The electronic device according to claim 8, wherein the rotatable member comprises a rotatable base and an antenna module disposed on the rotatable base, and the rotatable member connecting slot is formed on the rotatable base.

10. The electronic device according to claim 8, further comprising a heat pipe pivotally connected to the rotatable base.

11. The electronic device according to claim 10, further comprising a device housing, wherein the mounting bracket is fixedly connected to the device housing, and the heat pipe is thermally connected to the device housing.

12. The electronic device according to claim 8, wherein the coupler groove comprises a first length direction, the coupler protrusion comprises a second length direction, and the first length direction is perpendicular to the second length direction.

13. The electronic device according to claim 8, wherein the plate body comprises a first surface and a second surface, the coupler protrusion is formed on the first surface, the coupler further comprises two stopper blocks formed on the second surface and located at two sides of the coupler groove.

14. The electronic device according to claim 13, wherein the power source comprises a power source rotating plate, the power source protrusion is formed on the power source rotating plate, and the two stopper blocks abut against the power source rotating plate.

15. The electronic device according to claim 8, wherein the power source protrusion is rectangular or oval.

16. The electronic device according to claim 15, wherein the coupler groove comprises a first length, the coupler protrusion comprises a second length, the first length is less than or equal to the second length, the power source protrusion comprises a third length, the rotatable member connecting slot comprises a fourth length, the third length is less than or equal to the first length, and the fourth length is greater than or equal to the second length.

* * * * *